Figure 10:
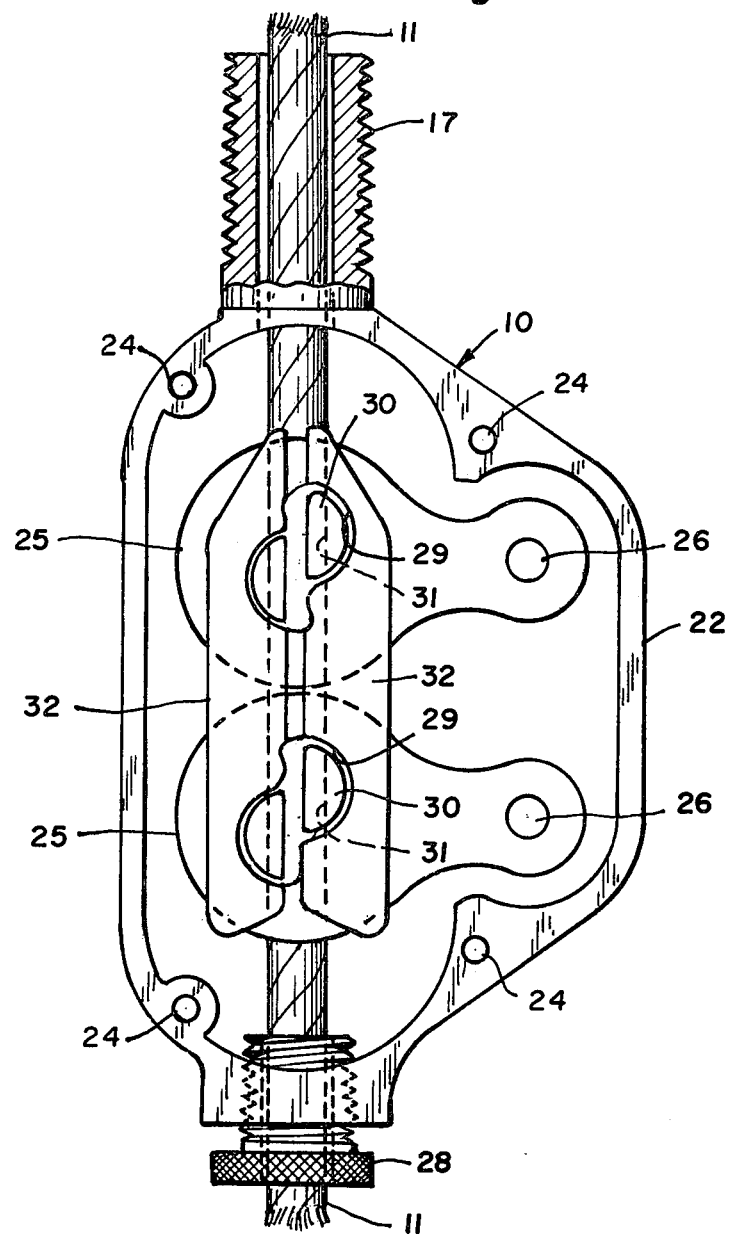

United States Patent [19]

Patterson, III et al.

[11] 4,103,871
[45] * Aug. 1, 1978

[54] WIRE ROPE BINDER

[76] Inventors: W. W. Patterson, III; Eugene F. Grapes, both c/o W. W. Patterson & Company, 830 Brocket St., Pittsburgh, Pa. 15233

[*] Notice: The portion of the term of this patent subsequent to Jan. 27, 1993, has been disclaimed.

[21] Appl. No.: 737,171

[22] Filed: Nov. 1, 1976

Related U.S. Application Data

[62] Division of Ser. No. 618,807, Oct. 2, 1975, Pat. No. 4,062,520, which is a division of Ser. No. 399,826, Sep. 24, 1973, Pat. No. 3,934,855.

[51] Int. Cl.² .................................. A63B 61/04
[52] U.S. Cl. ................................ 254/164; 254/64
[58] Field of Search .......... 254/161, 163, 164, 135 R, 254/77, 64, 76, 78, 105, 191; 24/68 R, 134; 248/339, 327, 59

[56] References Cited

U.S. PATENT DOCUMENTS

| 662,133 | 11/1900 | Passmore | 254/161 |
|---|---|---|---|
| 737,846 | 9/1903 | Jennings | 254/161 |
| 1,239,061 | 9/1917 | Tangen | 254/161 |
| 1,318,078 | 10/1919 | Hettinger | 254/161 |
| 3,348,812 | 10/1967 | Story | 254/161 |
| 3,799,503 | 3/1974 | Desplats | 254/135 R |
| 3,934,855 | 1/1976 | Patterson et al. | 254/135 R |

*Primary Examiner*—Trygve M. Blix
*Assistant Examiner*—Kenneth Noland
*Attorney, Agent, or Firm*—Buell, Blenko & Ziesenheim

[57] ABSTRACT

The specification discloses various embodiments of apparatus adapted to function as convertible wire rope load binders, container lashing or pullers. All embodiments utilize a wire rope clamp of the type which grips the wire rope on tensioning of the wire rope, and a threaded tubular extension coaxial with the rope pass line, in combination with a slack take-up device, which may be any of a variety of slack take-up devices threaded onto the tubular extension. A preferred embodiment employs a slack take-up device in the form of an over-center or toggle lever and a sheave device attached to the body of the clamp. Another embodiment employs a combined hook and clevis device having a screw connection to the body of the clamp. Another embodiment utilizes a winch device on the tensioning end of the wire rope to provide for tensioning the wire rope. Another embodiment employs a rectangular frame surrounding the body of the clamp, the frame having an opening through which a threaded tubular extension on the clamp body extends. A nut on the tubular extension cooperates with the frame to adjust the body of the clamp in relation to the frame.

2 Claims, 13 Drawing Figures

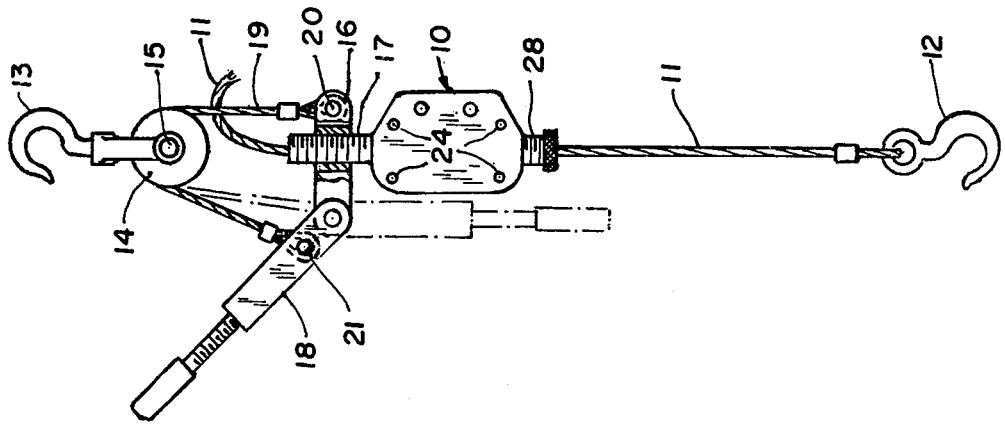
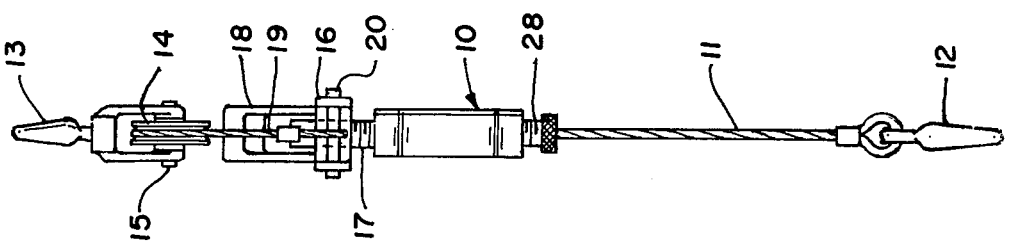
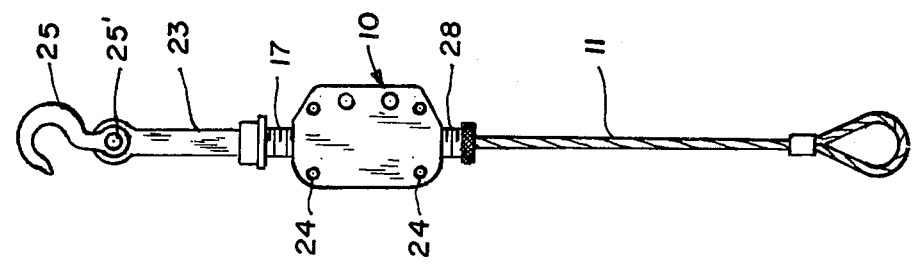
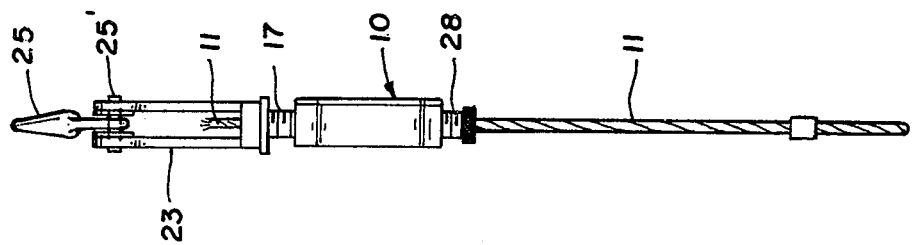

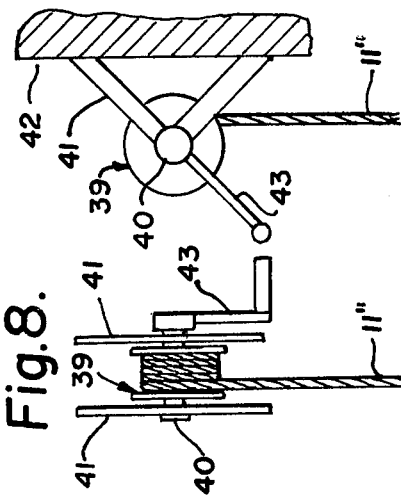
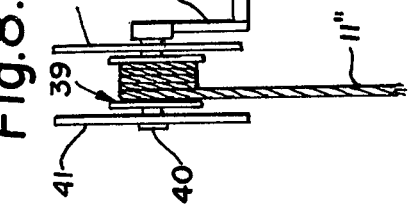
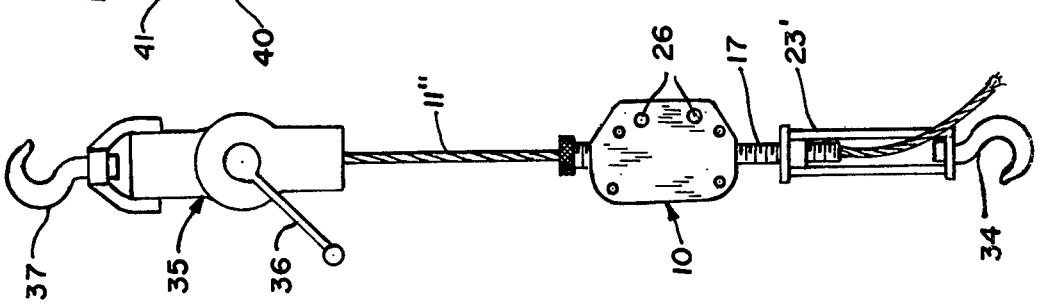
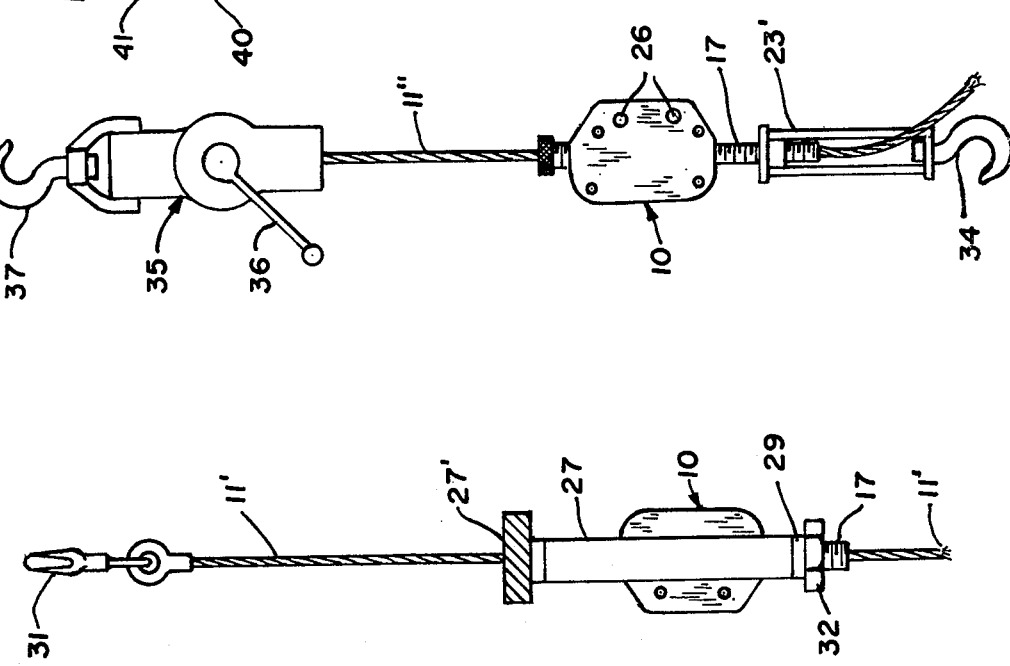
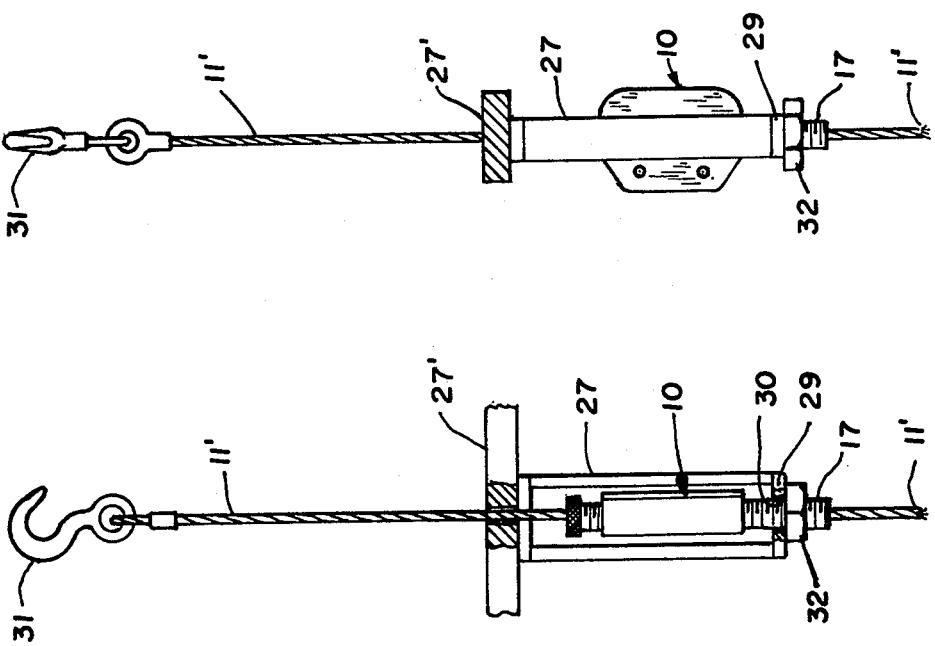

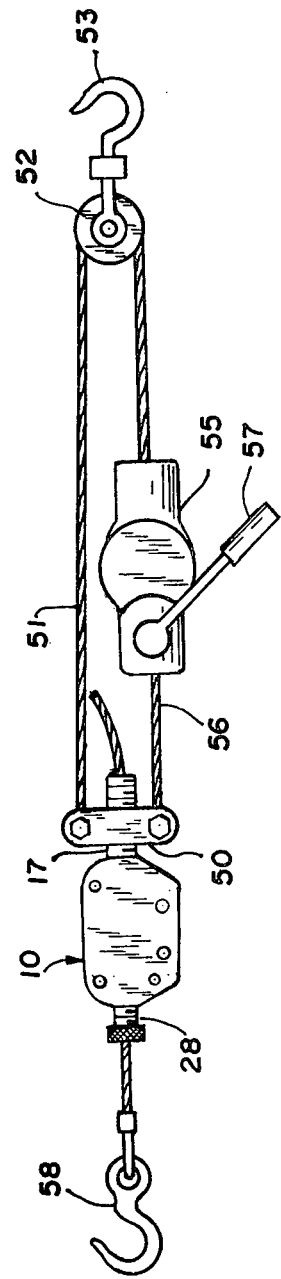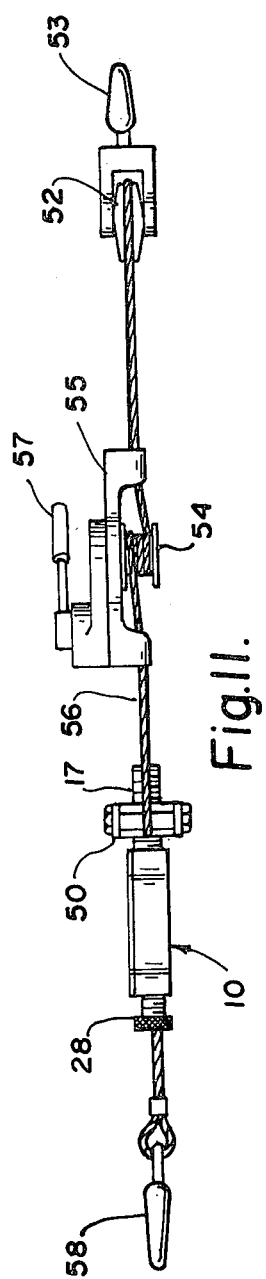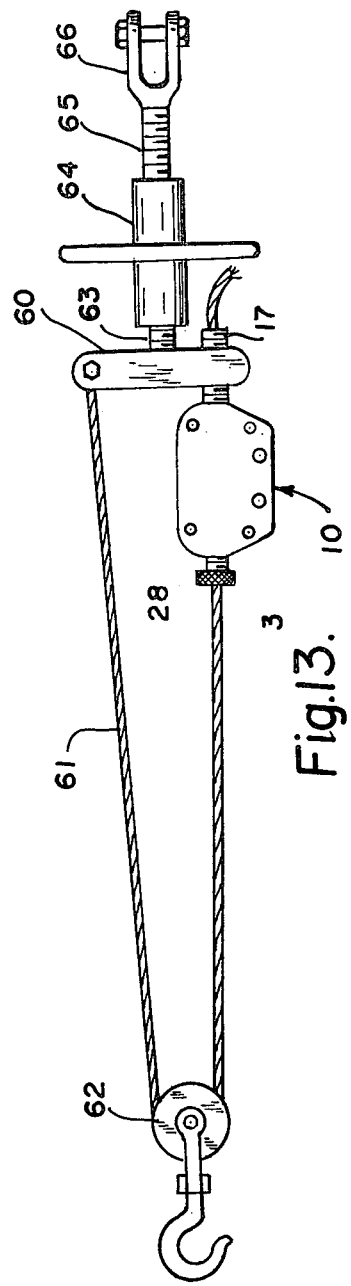

WIRE ROPE BINDER

This application is a division of our copending application Ser. No. 618,807, filed Oct. 2, 1975 now U.S. Pat. No. 4,062,520, which was in turn a division of our copending application Ser. No. 399,826, now U.S. Pat. No. 3,934,855 Sep. 24, 1973.

This invention relates to load binders utilizing a quickly adjustable wire rope clamp.

Load binders of the chain link type have long been known. More recently, with the advent of the wire rope type of load binder, difficulties have arisen because of the inability of existing wire rope clamps to maintain an adequate grip on the wire rope.

In U.S. Pat. No. 3,395,892, issued Aug. 6, 1968, a so-called "over-center load binder and gripping device" is disclosed. This device is difficult to operate because of the over-center toggle arrangement employed.

We propose to provide several embodiments of wire rope load binder apparatus including a preferred embodiment of apparatus, in which a slack take-up device functions cooperatively with the body of a wire rope clamp device.

We propose to provide a preferred embodiment of apparatus in which an over-center toggle lever is detachably secured to the body of a wire rope clamp, and is connected via a wire rope cable and pulley to a hook.

We also propose to provide an embodiment of the invention having a hook and clevis device having a screw connection to the body of a wire rope clamp.

We propose to provide an embodiment of the invention in which the end of the wire rope, opposite the hook and clevis device, is connected to a winch device.

We also propose to provide an embodiment in which the body of the wire rope clamp is contained within an independently supported rectangular frame and has a threaded lug which projects through a hole in the frame, a nut on the lug cooperating with the frame to exert tension in the wire rope.

The above embodiments of convertible wire rope load binder, container lashing, and puller apparatus are hereinafter more specifically described in relation to the accompanying drawings, wherein:

FIGS. 1 and 2 are side and end elevational views, respectively, of a preferred form of apparatus employing an over-center and pulley arrangement, FIGS. 3 and 4 are side and end elevational views, respectively, of another embodiment, FIGS. 5 and 6 are side and end elevational views, respectively, of another embodiment, FIG. 7 is a side elevational view of another embodiment employing a winch at one end, FIGS. 8 and 9 are fragmental elevational and end views, respectively, of another embodiment employing a different type of winch, FIG. 10 is a side elevational view of the wire rope clamp shown in the preceding views, with a side cover removed for visibility of interior details, FIG. 11 is a top plan view of a puller or binder according to still another embodiment of this invention, FIG. 12 is a side elevational view of the puller or binder of FIG. 11, and FIG. 13 is a side elevational view of an additional embodiment of binder according to the invention.

Referring to FIGS. 1 and 2 of the drawings, the preferred embodiment of load binder apparatus there shown comprises a wire rope clamp 10 of the type shown in FIG. 10 and hereinafter more fully described, and a wire rope 11 with a hook 12 at its lower end, suspended from the clamp 10. The embodiment further comprises an upper supporting hook 13 having a clevis in which a pulley 14 is rotatively mounted as on a pin 15, a base 16 adjustably secured to an upstanding tubular lug 17 on the body of the clamp 10, as by a screw-threaded connection, a bifurcated lever 18 pivotally mounted at one end of the base 16, and a cable 19, one end of which is coupled to a pin 20 in the base 16, passes over the pulley 14 and has its other end coupled to a pin 21 on the lever 18.

Referring to FIG. 10, the wire rope clamp 10 shown comprises a body 22 of nearly trapezoidal shape. The cover for one side is shown removed but is removably attached as by a plurality of screws 24. Within the body are a pair of essentially parallel arms 25, each pivotally mounted in the body as on a pin 26 at one end. The arms 25 are bifurcated and straddle the wire rope 11 which extends vertically through the body of the clamp. The rope 11 enters the body at the bottom of the body through a threaded sleeve fitting 28 and exits through the tubular lug 17. The arms have staggered transverse semi-circular openings 29 therethrough in which a pair of semi-circular cylinder elements 30 are respectively disposed. The flat faces of the cylinder elements 30 contain curved recesses 31 conforming to the curvature of the cable 11. Additional support elements 32 for the cylinder elements 30 may be provided if desired.

Assuming the body of the clamp 10 to be supported, tension exerted downwardly on the wire rope 11, as by a weight carried by hook 12, causes the arms 25 to pivot downwardly. The semi-circular cylinders 30 are thus shifted laterally towards each other to correspondingly grip the wire rope by coaction with openings 29 in arms 25. Conversely, if the upper end of the wire rope 11 is pulled, the arms pivot reversely and the grip of semi-circular cylinders on the wire rope is released to allow the rope to move upwardly relative to the clamp body.

Let it now be assumed that it is desired to employ the apparatus of FIGS. 1 and 2 as a binder for a load. The length of the wire rope 11 is first adjusted appropriately to surround the load and the position of the clamp 10 is fixed thereon. With the lever 18 in the position indicated in solid lines in FIG. 1 and the two hooks 12 and 13 interlocked, additional tightening adjustment of the clamp 10 relative to the wire rope 11 may now be effected. Final tightening of the rope binder is then accomplished by shifting the lever 18 to the over-center position alongside the clamp 10 indicated by the broken lines.

As shown in the drawings the handle 18 is made up of two parts threaded together so as to make the length adjustable. This provides the necessary length for leverage when needed, yet permits it to be compacted for storage.

It will be seen that if hook 12 in anchored and hook 13 secured to an object, the apparatus may be employed to drag or pull the object toward the anchored end of the wire rope 11.

It should be noted that by reason of the cable and pulley connection between the toggle lever 18 and the hook 13, frictional forces are minimized and over-center movement of the toggle lever 18 is made comparatively easy. By the same token, the reverse movement of lever 18 to loosen the wire rope binder is made relatively easy.

In FIGS. 3 and 4, a different embodiment is shown, wherein a clevis 23 is provided with a tapped hole at one end which screws on the threaded lug 17 on the body of the clamp 10. A hook 25 is secured to the distal end of the clevis, as by a pin 25' extending between the ends of the clevis arms. This form of the invention provides an end fitting in the form of a hook which can be positioned at any point along the length of a rope. Obviously another fitting than a hook could be used.

In this embodiment, the clamp 10 is first shifted along the wire rope 11 to a desired position corresponding to a desired length of wire rope 11. Clevis 23 may then be turned on the lug 17 to provide further adjustment of the position of hook 25 along the length of the wire rope 11.

FIGS. 5 and 6, another embodiment is shown of apparatus using the wire rope clamp 10. In this embodiment the clamp 10 is disposed within a rectangular frame 27 which is independently supported as by attachment to a structural member 27'. One of the cross members 29 of the frame 27 has a hole 30 therein slightly larger in diameter than the threaded lug 17. The one end of the wire rope 11' which passes through clamp 10 has a hook 31 secured thereto, which may be attached to an object desired to be tightened. A nut 32 on the threaded lug 17 engages the bottom of cross member 29. As the nut 32 is turned on the lug 17 the clamp 10 and wire rope 11' are shifted relative to the frame 27 and structural member 27'. The arrangement thus becomes what is commonly called a "center-hole" puller. This kind of apparatus is particularly useful in furnishing stiffening between two spaced supports when the clamp must be outside the supports or for tightening around a bundle using an eye as a choker hole.

It will be apparent that the object to be pulled need not be in a straight line relation to the clamp 10, as the wire rope 11' may be threaded through one or more pulleys.

In FIG. 7, another embodiment of the apparatus is shown, wherein a clevis 23', similar to clevis 23, is screwed on the threaded lug 17 of the clamp 10 and a hook 34 is swiveled to the distal end of the clevis 23'. The one end of the wire rope 11" adjacent the tubular lug 17 is free, whereas the opposite end of the wire rop 11" is connected to a winch 35. Winch 35 may be motor operated or operated manually by a crank lever 36 as shown, and supported by a swiveled hook 37 from a convenient member (not shown). The unit is thus equivalent to what is commonly called a come-along or puller. The standard type of come-along has only six feet of pull and consequently is limited to that distance from the object to be pulled or lifted.

In contrast to the standard type of come-along, the above described apparatus is limited only by the length of wire rope 11" used. Obviously the clamp 10 may be located at any point on the wire rope 11" corresponding to the length of wire rope required.

Many winches are used only as tensioning devices to ultimately pull only a few feet of rope but need a large drum capacity because the load is located at some distance from the winch. By using the above apparatus, the weight, size and cost of the winch can be reduced.

Referring to FIGS. 8 and 9, a variation of the apparatus of FIG. 7 is shown, in which a hoisting drum or reel 39 is substituted for the winch 35. In this case, the shaft 40 of the reel is supported by a pair of struts 41 attached to a structural member or wall 42. As shown, the shaft 40 of reel 39 is turned manually by a crank 43.

In FIGS. 11 and 12 still another embodiment of the invention is illustrated in which a beam 50 is threaded onto the tubular lug 17 and extends an equal distance on opposite sides thereof. A cable 51 is attached to one end of the beam and passes through sheave 52 carrying hook 53 onto the mandrel 54 of a double action "come-along" 55. A second cable 56 is attached to the other end of the beam and to the mandrel 54 so that on rotation of handle 57 the mandrel takes up both cables moving the hooks 53 and 58 toward one another.

FIG. 13 illustrates an embodiment of this invention in which the lug 17 is threaded in one end of a beam 60. A cable 61 is attached at one end to the opposite end of beam 60 and passes over a hook sheave 62 and through the cable clamp 10. The beam 60 is provided with a center shaft 63 threaded or rotatably mounted in one end of a turnbuckle 64 having as usual a coaxial opposing threaded shaft 65 with a clevis 66. This device provides a form of infinite length turnbuckle having a vast number of applications in the field of cargo lashing and the like.

While specific embodiments of the apparatus are here shown and described, it will be understood that variations therein are possible within the scope of the following claims.

We claim:
1. A wire rope binder apparatus comprising a wire rope of given length, a clamp having a body through which the wire rope extends adjustable on said wire rope to any position on its length with respect to one end thereof and having a threaded tubular extension thereon, threaded substantially over its length, through which the other end of said wire rope coaxially projects, a frame means having an opening through which the tubular extension on the clamp extends, and nut means screwed on said threaded tubular extension adjustably bearing against said frame means for pulling said clamp relative to said frame means to apply a tensioning force to said other end of said wire rope and means on said frame for attachment to a second object spaced from said first object and means in said body adapted to grip the wire rope on tensioning the wire rope, a winch having means for supporting it in a fixed position on a first object, and to which said one end of the wire rope connects for applying a tension force to said wire rope.

2. A wire rope binder apparatus according to claim 1, wherein a clevis means is adjustably attached to the body of said clamp, and a hook is connected by a swivel connection to the distal end of the clevis means.

* * * * *

UNITED STATES PATENT AND TRADEMARK OFFICE
CERTIFICATE OF CORRECTION

PATENT NO. : 4,103,871
DATED : August 1, 1978
INVENTOR(S) : W.W. Patterson, III and Eugene F. Grapes It is certified that error appears in the above-identified patent and that said Letters Patent are hereby corrected as shown below:

Column 2, line 58, "in" should be --is--.

Column 3, line 16, --In-- should be inserted before "FIGS."

Column 3, line 44, "rop" should be --rope--.

Signed and Sealed this

Seventeenth Day of April 1979

[SEAL]

Attest:

RUTH C. MASON
Attesting Officer

DONALD W. BANNER
Commissioner of Patents and Trademarks